US009905095B2

(12) United States Patent
Yue

(10) Patent No.: US 9,905,095 B2
(45) Date of Patent: Feb. 27, 2018

(54) METHOD AND SYSTEM FOR MOVEMENT DETECTION AND SERVICE SERVER

(71) Applicant: ZTE CORPORATION, Shenzhen, Guangdong Province (CN)

(72) Inventor: Zhipeng Yue, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 451 days.

(21) Appl. No.: 14/421,193

(22) PCT Filed: Aug. 13, 2013

(86) PCT No.: PCT/CN2013/081337
§ 371 (c)(1),
(2) Date: Feb. 12, 2015

(87) PCT Pub. No.: WO2014/026586
PCT Pub. Date: Feb. 20, 2014

(65) Prior Publication Data
US 2015/0243142 A1 Aug. 27, 2015

(30) Foreign Application Priority Data

Aug. 13, 2012 (CN) .......................... 2012 1 0286699

(51) Int. Cl.
*H04N 7/18* (2006.01)
*G08B 13/196* (2006.01)
(Continued)

(52) U.S. Cl.
CPC .......... *G08B 13/19604* (2013.01); *G06T 7/20* (2013.01); *G08B 13/1963* (2013.01);
(Continued)

(58) Field of Classification Search
CPC .......... G08B 13/19604; G08B 13/1963; G08B 21/22; H04L 67/10; H04N 7/183; H04N 7/188
See application file for complete search history.

(56) References Cited

U.S. PATENT DOCUMENTS

| 5,111,288 A | * | 5/1992 | Blackshear | ...... G08B 13/19619 348/143 |
| 2007/0115351 A1 | * | 5/2007 | McCormack | .... G08B 13/19606 348/36 |

(Continued)

FOREIGN PATENT DOCUMENTS

| CN | 101840578 A | 9/2010 |
| CN | 102843551 A | 12/2012 |

(Continued)

OTHER PUBLICATIONS

European Search Report dated Jul. 21, 2015 of Patent Application No. 13829442.6.

*Primary Examiner* — Shawn An
(74) *Attorney, Agent, or Firm* — Plumsea Law Group, LLC

(57) ABSTRACT

A method for moving detection includes: a service server acquiring a first surveillance image captured by a camera at a preset first moment, and calculating a first moving angle of a pan-tilt; acquiring a second surveillance image captured by the camera at a preset second moment, and calculating a second moving angle of the pan-tilt; and determining by comparison whether common images in the first surveillance image and the second surveillance image are consistent according to the first moving angle and the second moving angle; if inconsistent, triggering a moving detection alarm. The embodiments of the present document also disclose a corresponding system and a service server. The disclosed solution of the embodiments of the present document is (Continued)

applied to implement moving detection when a camera is in moving state, ensures the accuracy of moving detection alarm in a great extent.

17 Claims, 8 Drawing Sheets

(51) Int. Cl.
  *G06T 7/20* (2017.01)
  *G08B 21/22* (2006.01)
  *H04L 29/08* (2006.01)
(52) U.S. Cl.
  CPC .............. *G08B 21/22* (2013.01); *H04L 67/10* (2013.01); *H04N 7/183* (2013.01); *G06T 2207/30232* (2013.01); *G08B 13/19606* (2013.01); *H04N 7/188* (2013.01)

(56) References Cited

U.S. PATENT DOCUMENTS

| | | | |
|---|---|---|---|
| 2008/0267453 | A1 | 10/2008 | Avrahami |
| 2010/0152897 | A1* | 6/2010 | Muller ...................... B25J 5/00 700/259 |
| 2011/0261196 | A1 | 10/2011 | Gabel |

FOREIGN PATENT DOCUMENTS

| | | |
|---|---|---|
| JP | 2007-36742 A | 2/2007 |
| WO | 2004/038659 A2 | 5/2004 |
| WO | WO 2004/038659 A2 * | 5/2004 |

* cited by examiner

METHOD AND SYSTEM FOR MOVEMENT DETECTION AND SERVICE SERVER

CROSS-REFERENCE TO RELATED APPLICATION(S)

This application is the U.S. National Phase application of PCT application number PCT/CN2013/081337 having a PCT filing date of Aug. 13, 2013, which claims priority of Chinese patent application 201210286699.3 filed on Aug. 13, 2012, the disclosures of which are hereby incorporated by reference.

TECHNICAL FIELD

The present document relates to multimedia technology field, and particularly, to a method and a system for moving detection and a service server.

BACKGROUND OF THE RELATED ART

Video surveillance is an important component of a security precaution system, which is a comprehensive system with rather high precaution capability. Video surveillance is widely applied to many fields by virtue of being intuitive, accurate, in-time and having ample information content. In recent years, with fast development of computer, internet, image processing, and transmission technology, the video surveillance technology also has made a significant development, which is a multimedia surveillance with a computer being a core, wherein management is performed by the computer, and not determined by the subjective consciousness of human.

Video image information is the most important information data in video surveillance system. The core services of the video surveillance system are all based on complete and valid video images. The conventional moving detection alarm is that the static camera performs surveillance on a fixed region, and once the images in the fixed region change, the moving detection alarm is triggered. However, with this moving detection method, if all of the objects in the surveillance region are static and only the camera is moving, thus, since the acquired images change, the moving detection alarm still can be triggered, thereby affecting the accuracy of mobile detection alarm.

SUMMARY

The main purpose of the present document is to provide a method and a system for moving detection, and a service server, so as to implement moving detection when the camera is in a moving state, thereby it can ensure the accuracy of moving detection alarm.

The present document provides a method for moving detection, comprising:

a service server acquiring a first surveillance image captured by a camera at a preset first moment, and calculating a first moving angle of a pan-tilt;

acquiring a second surveillance image captured by the camera at a preset second moment, and calculating a second moving angle of the pan-tilt; and determining by comparison whether common images in the first surveillance image and the second surveillance image are consistent according to the first moving angle and the second moving angle; if inconsistent, triggering a moving detection alarm.

Preferably, before executing the step of acquiring a first surveillance image captured by a camera at a preset first moment, the method further comprises:

sending a control request to the pan-tilt to control movement of the pan-tilt;

receiving a control response message returned by the pan-tilt, and recording a current moving speed reported by the pan-tilt.

Preferably, the step of acquiring a first surveillance image captured by a camera at a preset first moment and calculating a first moving angle of a pan-tilt comprises:

acquiring the first surveillance image captured by the camera at the preset first moment when the pan-tilt moves to the first moving angle;

calculating an angle value of the first moving angle according to the current moving speed.

Preferably, the step of acquiring a second surveillance image captured by the camera at a preset second moment, and calculating a second moving angle of the pan-tilt comprises:

acquiring the second surveillance image captured by the camera at the preset second moment when the pan-tilt moves to the second moving angle;

calculating an angle value of the second moving angle according to the current moving speed.

Preferably, before executing the step of determining by comparison whether common images in the first surveillance image and the second surveillance image are consistent according to the first moving angle and the second moving angle, the method further comprises:

determining a viewing angle range of the common image of the first surveillance image and the second surveillance image according to the viewing angle of the camera and the current moving speed.

The present document also provides a service server, comprising:

a first acquisition and calculation module, configured to acquire a first surveillance image captured by a camera at a preset first moment, and calculate a first moving angle of a pan-tilt;

a second acquisition and calculation module, configured to acquire a second surveillance image captured by a camera at a preset second moment, and calculate a second moving angle of a pan-tilt;

a comparison module, configured to determine by comparison whether common images in the first surveillance image and the second surveillance image are consistent according to the first moving angle and the second moving angle, if inconsistent, trigger a moving detection alarm.

Preferably, the service server further comprises:

a request sending module, configured to send a control request to the pan-tilt to control movement of the pan-tilt; and a recording module, configured to: receive a control response message returned by the pan-tilt, and record a current moving speed reported by the pan-tilt.

Preferably, the first acquisition and calculation module comprises:

a first acquisition unit, configured to acquire the first surveillance image captured by the camera at the preset first moment when the pan-tilt moves to the first moving angle; and a first calculation unit, configured to calculate an angle value of the first moving angle according to the current moving speed.

Preferably, the second acquisition and calculation module comprises:

a second acquisition unit, configured to acquire the second surveillance image captured by the camera at the preset second moment when the pan-tilt moves to the second moving angle; and a second calculation unit, configured to calculate an angle value of the second moving angle according to the current moving speed.

Preferably, the service server further comprises:

a determination module, configured to determine a viewing angle range of the common image of the first surveillance image and the second surveillance image according to a viewing angle of the camera and the current moving speed.

The present document further provides a system for moving detection, comprising a pan-tilt extending a surveillance scope through a rotation of the pan-tilt, a camera capturing a surveillance image, and a service server, wherein, the service server is configured to:

acquire a first surveillance image captured by the camera at a preset first moment, and calculate a first moving angle of the pan-tilt;

acquire a second surveillance image captured by the camera at a preset second moment, and calculate a second moving angle of the pan-tilt;

determine by comparison whether common images in the first surveillance image and the second surveillance image are consistent according to the first moving angle and the second moving angle, if inconsistent, trigger a moving detection alarm.

According to the embodiments of the present document, the service server acquires the first surveillance image captured by the camera at the preset first moment, and calculates the first moving angle of the pan-tilt; and acquires the second surveillance image captured by the camera at the preset second moment, and calculates the second moving angle of the pan-tilt; determines by comparison whether common images in the first surveillance image and the second surveillance image are consistent, if inconsistent, triggers the moving detection alarm. This method is applied to implement the moving detection when the camera is in moving state, and ensures the accuracy of moving detection alarm in a great extent.

The implementation of the purpose, the function characteristics, and the virtues of the present document will be further described in combination with embodiments and by referring to the accompanying drawings.

PREFERRED EMBODIMENTS OF THE INVENTION

It should be understood that the specific embodiments described here are merely used to explain the present document, while not used to limit the present document.

The present document provides a method for moving detection, which implements moving detection in the situation of camera moving. It is to capture surveillance images under the current surveillance circumstances by a camera at preset moments during the process of controlling a rotation of the pan-tilt, and then compare the acquired surveillance images captured by the camera at different moments and determine whether common images in the surveillance images change, if yes, determine that moving detection occurs at this moment, and then trigger the moving detection alarm.

Figure 1:
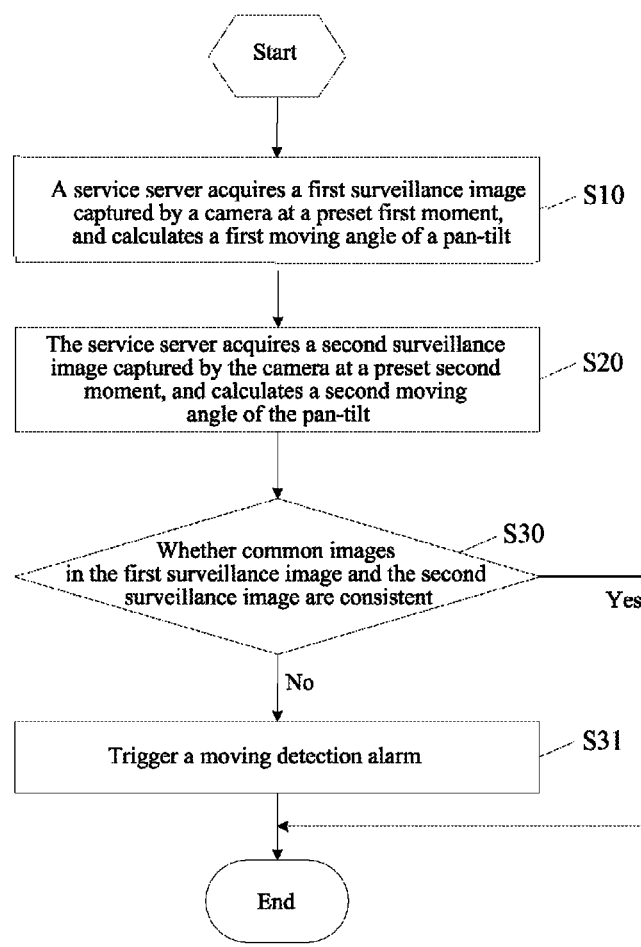
FIG. 1 is a schematic flowchart of one embodiment of the method for moving detection of the present document.

Referring to FIG. 1, FIG. 1 is a schematic flowchart of one embodiment of the method for moving detection of the present document.

The method for moving detection provided by the present embodiment comprises:

In step S10, a service server acquires a first surveillance image captured by a camera at a preset first moment, and calculates a first moving angle of a pan-tilt;

In step S20, it acquires a second surveillance image captured by the camera at a preset second moment, and calculates a second moving angle of the pan-tilt;

In step S30, it compares common images in the first surveillance image and the second surveillance image according to the first moving angle and the second moving angle, and determines whether the common images are consistent; if inconsistent, it is to proceed to step S31; if yes, it is to end the flow; and In step S31, it triggers a moving detection alarm.

As the viewing angle of the camera is usually limited, when the scope of the region requiring surveillance in the current surveillance environment is rather large, it is required to control the movement of the pan-tilt in a certain direction to achieve the purpose of extending the surveillance scope. In the present embodiment, the service server controls the pan-tilt to move in a certain speed, and the camera captures the first surveillance image at the preset first moment when the pan-tilt moves to the first moving angle and acquires the first surveillance image. Since the viewing angle of the camera is known, and the moving speed of the pan-tilt is also known, the first moving angle of the pan-tilt at present can be calculated according to the first moment and the moving speed of the pan-tilt.

During the process that the pan-tilt continues to move, the camera captures the second surveillance image at the preset second moment when the pan-tilt moves to the second moving angle, and acquires the first surveillance image. In addition, the second moving angle of the pan-tilt at present is calculated according to the second moment and the moving speed of the pan-tilt. In the present embodiment, the time interval between the second moment and the first moment is usually required to meet a certain relationship, that is, it is required to be determined according to the viewing angle of the camera and the moving speed of the pan-tilt.

After the first surveillance image and the second surveillance image captured by the camera are acquired, and the corresponding first moving angle and second moving angle are calculated, the viewing angle scope of the common image of the first surveillance image and the second surveillance image can be determined according to the first moving angle and the second moving angle as well as the viewing angle of the camera. Afterwards, it is to compare the common images in the first surveillance image and the second surveillance image to determine whether they are consistent, if inconsistent, it indicates the current surveillance environment changes, and the moving surveillance occurs, and then it is to trigger the moving detection alarm.

According to the embodiment of the present document, the service server acquires the first surveillance image captured by the camera at the preset first moment, and calculates the first moving angle of the pan-tilt; and acquires the second surveillance image captured by the camera at the preset second moment, and calculates the second moving angle of the pan-tilt; determines by comparison whether the common images in the first surveillance image and the second surveillance image are consistent, if inconsistent, triggers the moving detection alarm. This method is applied to implement the moving detection when the camera is in moving state, and ensures the accuracy of moving detection alarm.

Figure 2:
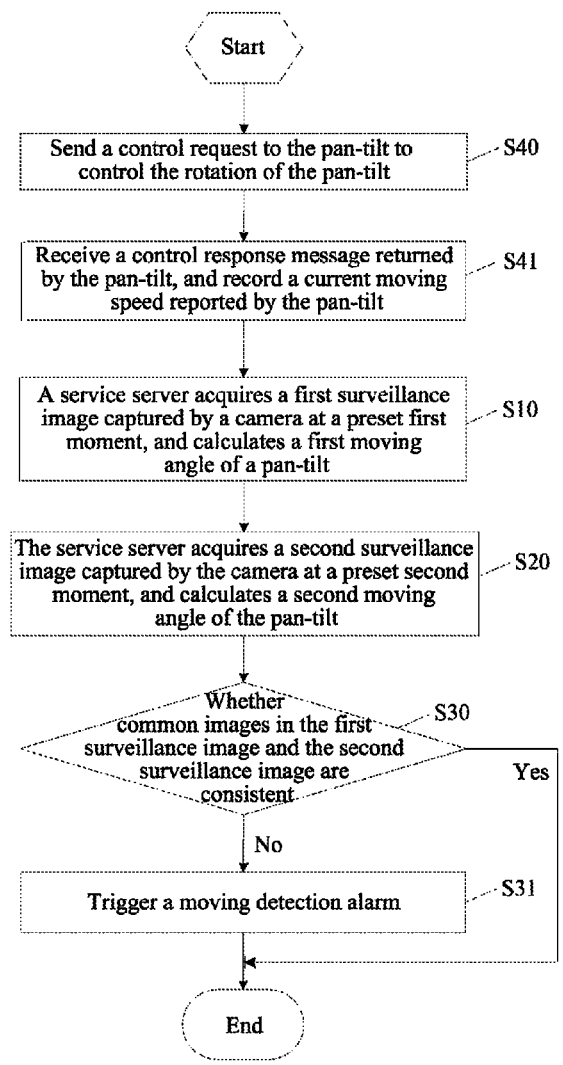
FIG. 2 is a schematic flowchart of another embodiment of the method for moving detection of the present document.

Referring to FIG. 2, FIG. 2 is a schematic flowchart of another embodiment of the method for moving detection of present document.

With the above embodiment as the basis, before executing step S10, the method for moving detection further comprises:

In step S40, it is to send a control request to the pan-tilt to control the rotation of the pan-tilt;

In step S41, it is to receive a control response message returned by the pan-tilt, and record a current moving speed reported by the pan-tilt.

During the process that the pan-tilt moves, before the camera captures the surveillance image, the service server sends a control request to the pan-tilt to control the movement of the pan-tilt at first; after receiving the control request, the pan-tilt returns a control response message to the service server, and starts to move in a moving speed prescribed by the service server, and meanwhile reports its initial moving speed to the service server; the service server will return an acknowledgement message to the pan-tilt, and record the current moving speed of the pan-tilt received by the service server.

In the present embodiment, during the process that the pan-tilt moves, it is possible that the service server sends a control request to the pan-tilt at any time according to the requirement of environment surveillance to control the pan-tilt to change its moving speed. By this way, when the pan-tilt receives the control request, changes its moving speed and continues to move, the pan-tilt will report its current moving speed to the service server in time; while the service server updates the moving speed which is recorded previously according to the current moving speed received by the service server.

Before the camera captures the surveillance image, the service server sends a control request to the pan-tilt to control the movement of the pan-tilt at first, and after receiving the control response message returned by the pan-tilt, the service server records the current moving speed reported by the pan-tilt. Thus, the recorded current moving speed can be used to calculate the angle value of the moving angle after the surveillance image is acquired, thereby improving the convenience and accuracy of moving detection.

Figure 3:
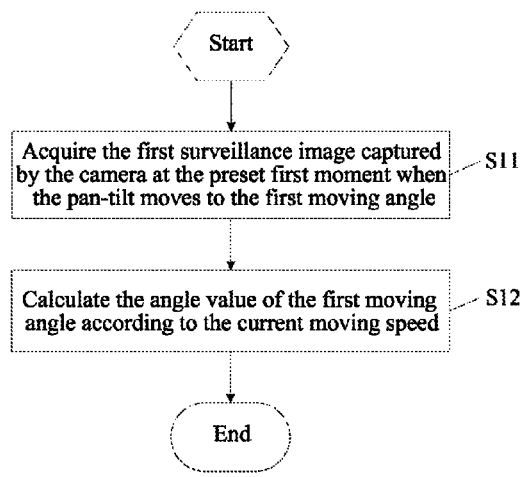
FIG. 3 is a schematic flowchart of acquiring a first surveillance image and computing a first rotation angle of the pan-tilt in the method for moving detection of the present document.

Referring to FIG. 3, FIG. 3 is a schematic flowchart of acquiring the first surveillance image and calculating the first rotation angle of the pan-tilt in the method for moving detection of the present document.

Based on one embodiment of the method for moving detection according to the present document, step S10 comprises:

In step S11, it is to acquire the first surveillance image captured by the camera at the preset first moment when the pan-tilt moves to the first moving angle;

In step S12, it is to calculate the angle value of the first moving angle according to the current moving speed.

In the present embodiment, it is required to extend the surveillance scope of the camera by the movement of the pan-tilt, and set several pigment analysis ratio in advance before capturing the surveillance image by the camera. For instance, it is to set the pigment value range of dark image where the lighting equipment needs to be opened, i.e. the percentages of the bright pigments, the normal pigments and the dark pigments; set the pigment value range of bright light rays where shading equipment needs to be opened, i.e. the percentages of the bright pigments, the normal pigments and the dark pigments.

When starting to capture an image, it is required to preset a first moment, which is indicated by t in the present embodiment, that is, the camera captures an image of the current surveillance environment at this moment when the pan-tilt moves to the first moving angle, and the service server acquires the first surveillance image captured by the camera through communication and connection with the camera. After acquiring the first surveillance image, the service server calculates the angle value of the first moving angle when the pan-tilt moves to the first moving angle according to the first moment t and the current moving speed of the pan-tilt recorded by the service server.

Figure 4:
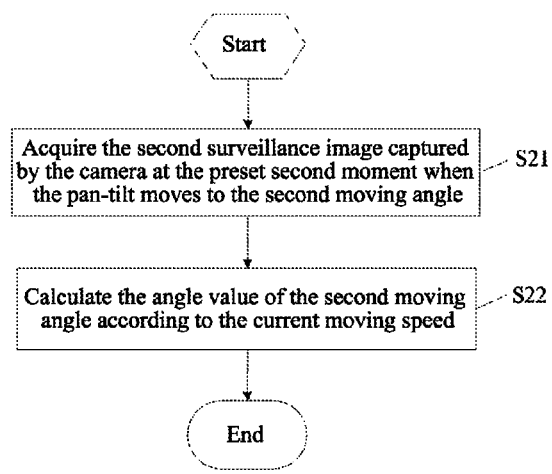
FIG. 4 is a schematic flowchart of acquiring a second surveillance image and computing a first rotation angle of the pan-tilt in the method for moving detection of the present document.

Referring to FIG. 4, FIG. 4 is a schematic flowchart of acquiring a second surveillance image and calculating a second rotation angle of the pan-tilt in the method for moving detection according to present document.

Based on one embodiment of the method for moving detection according to the present document, step S20 comprises:

In step S21, it is to acquire the second surveillance image captured by the camera at the preset second moment when the pan-tilt moves to the second moving angle;

In step S22, it is to calculate the angle value of the second moving angle according to the current moving speed.

In the present embodiment, the preset second moment can be indicated by t', as the time interval between the second moment t' and the first moment t is required to meet a certain relationship, that is, it needs to be determined according to the viewing angle of the camera and the moving speed of the pan-tilt, this time interval can be indicated by t". In the present embodiment, the time interval t" for acquiring the surveillance image must be less than (the viewing angle of the camera)/(the moving speed of the pan-tilt*2), therefore, the second moment t' can be preset according to the time interval t" and the first moment t.

After the second moment t' is set, when the pan-tilt continues to move from the first moving angle to the second moving angle, the camera captures an image of the current surveillance environment, and the service server acquires the second surveillance image captured by the camera currently through the connection and communication with the camera. After the second surveillance image is acquired, similarly, the angle value of the second moving angle can be calculated when the pan-tilt moves to the second moving angle according to the second moment t' and the current moving speed of the pan-tilt recorded by the service server.

The first surveillance image is captured by the camera at the preset first moment when the pan-tilt moves to the first moving angle, and the angle value of the first moving angle is calculated according to the current moving speed of the pan-tilt; and the second surveillance image is captured by the camera at the preset second moment when the pan-tilt moves to the second moving angle; and the angle value of the second moving angle is calculated according to the current moving speed of the pan-tilt. The obtained angle value of the first moving angle and the angle value of the second moving angle can be used to determine the angle range of the common image of the first surveillance image and the second surveillance image. Therefore, it further ensures to improve the convenience and accuracy of moving detection.

Figure 5:
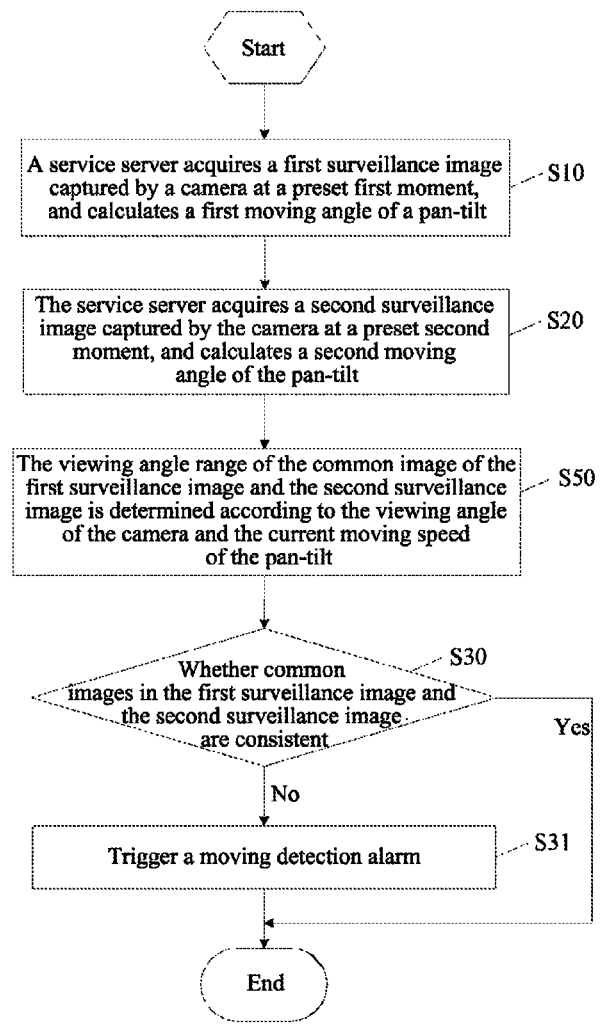
FIG. 5 is a schematic flowchart of a further embodiment of the method for moving detection of the present document.

Referring to FIG. 5, FIG. 5 is a schematic flowchart of a further embodiment of the method for moving detection according to present document.

Based on one embodiment of the method for moving detection according to the present document, before executing step S30, the method further comprises:

In step S50, the viewing angle range of the common image of the first surveillance image and the second surveillance image is determined according to the viewing angle of the camera and the current moving speed of the pan-tilt.

In the present embodiment, after the captured first surveillance image and the second surveillance image are acquired during the process that the pan-tilt moves, and the angle value of the first moving angle and the angle value of the second moving angle are calculated, according to the angle value of the first moving angle and the angle value of the second moving angle as well as the viewing angle of the camera and the current moving speed of the pan-tilt, the angle range of the common image part of the first surveillance image captured when the pan-tilt moves for the first moving angle and the second surveillance image captured when the pan-tilt moves for the second moving angle is determined, thereby whether moving detection occurs is judged according to the determined common image.

After the captured first surveillance image and the second surveillance image are acquired, and the angle value of the first moving angle and the angle value of the second moving angle are calculated, according to the viewing angle of the camera and the current moving speed of the pan-tilt, the viewing angle range of the common image of the first surveillance image and the second surveillance image is determined, so as to judge whether moving detection occurs, which further ensures the accuracy of moving detection alarm in a great extent.

The present document also provides a service server.

Figure 6:
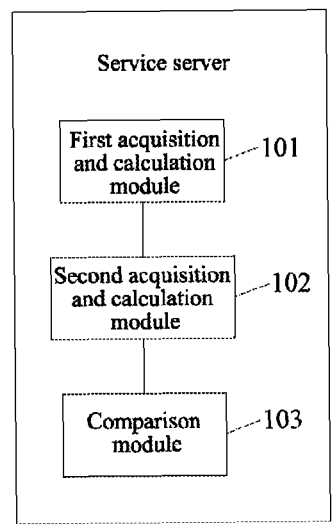
FIG. 6 is a structural diagram of one embodiment of the service server of the present document.

Referring to FIG. 6, FIG. 6 is the structural diagram of one embodiment of the service server according to the present document.

The service server provided by the present embodiment comprises:

a first acquisition and calculation module 101, used to acquire a first surveillance image captured by a camera at a preset first moment, and calculate a first moving angle of a pan-tilt;

a second acquisition and calculation module 102, used to acquire a second surveillance image captured by a camera at a preset second moment, and calculate a second moving angle of a pan-tilt;

a comparison module 103, used to determine by comparison whether common images in the first surveillance image and the second surveillance image are consistent according to the first moving angle and the second moving angle, if inconsistent, trigger a moving detection alarm.

As the viewing angle of the camera is usually limited, when the scope of the region requiring surveillance in the current surveillance environment is rather large, it is required to control the movement of the pan-tilt in a certain direction to achieve the purpose of extending the surveillance scope. In the present embodiment, the service server controls the pan-tilt to move in a certain speed, and the camera captures the first surveillance image at the preset first moment when the pan-tilt moves to the first moving angle and the first acquisition and calculation module 101 acquires the first surveillance image. Since the viewing angle of the camera is known, and the moving speed of the pan-tilt is also known, the first acquisition and calculation module 101 can calculate the first moving angle of the pan-tilt at present according to the first moment and the moving speed of the pan-tilt.

During the process that the pan-tilt continues to move, the camera captures the second surveillance image at the preset second moment when the pan-tilt moves to the second moving angle, and then the second acquisition and calculation module 102 acquires the first surveillance image. In addition, the second acquisition and calculation module 102 calculates the second moving angle of the pan-tilt at present according to the second moment and the moving speed of the pan-tilt. In the present embodiment, the time interval between the second moment and the first moment is usually required to meet a certain relationship, that is, it is required to be determined according to the viewing angle of the camera and the moving speed of the pan-tilt.

After the first surveillance image and the second surveillance image captured by the camera are acquired, and the corresponding first moving angle and second moving angle are calculated, the viewing angle scope of the common image of the first surveillance image and the second surveillance image can be determined according to the first moving angle and the second moving angle as well as the viewing angle of the camera. Afterwards, the comparison module compares the common images in the first surveillance image and the second surveillance image to determine whether they are consistent, if inconsistent, it indicates the current surveillance environment changes, and the moving surveillance occurs, and then the moving detection alarm is triggered.

According to the embodiment of the present document, the service server acquires the first surveillance image captured by the camera at the preset first moment, and calculates the first moving angle of the pan-tilt; and acquires the second surveillance image captured by the camera at the preset second moment, and calculates the second moving angle of the pan-tilt; determines by comparison whether the common images in the first surveillance image and the second surveillance image are consistent, if inconsistent, triggers the moving detection alarm. This method is applied to implement the moving detection when the camera is in moving state, and ensures the accuracy of moving detection alarm.

Figure 7:
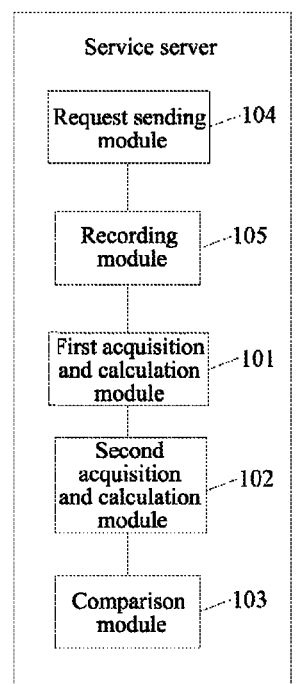
FIG. 7 is a structural diagram of another embodiment of the service server of the present document.

Referring to FIG. 7, FIG. 7 is a structural diagram of another embodiment of the service server according to the present document.

Based on the above embodiment, another embodiment of the service server according to the present document is put forward. In the present embodiment, the service server further comprises:

a request sending module 104, used to send a control request to the pan-tilt to control movement of the pan-tilt; and a recording module 105, used to receive a control response message returned by the pan-tilt, and record a current moving speed reported by the pan-tilt.

During the process that the pan-tilt moves, before the camera captures the surveillance image, the request sending module 104 of the service server sends a control request to the pan-tilt to control the movement of the pan-tilt at first; after receiving the control request, the pan-tilt returns a control response message to the service server, and starts to move in a moving speed prescribed by the service server, and meanwhile reports the initial moving speed to the service server; the service server will return an acknowledgement message to the pan-tilt, and the recording module 105 records the current moving speed of the pan-tilt received by the service server.

In the present embodiment, during the process that the pan-tilt moves, it is possible that the service server sends a control request by the request sending module 104 to the pan-tilt at any time according to the requirement of environment surveillance to control the change of moving speed of the pan-tilt. By this way, when the pan-tilt receives the control request, changes its moving speed and continues to move, the pan-tilt will report its current moving speed to the service server in time; while the service server updates the moving speed which is recorded by the recording module 105 previously according to the current moving speed received by the service server.

Before the camera captures the surveillance image, the service server sends a control request to the pan-tilt to control the movement of the pan-tilt at first, and after receiving the control response message returned by the pan-tilt, it records the current moving speed reported by the pan-tilt. Thus, the recorded current moving speed can be used to calculate the angle value of the moving angle after the surveillance image is acquired, thereby improving the convenience and accuracy of moving detection.

Figure 8:
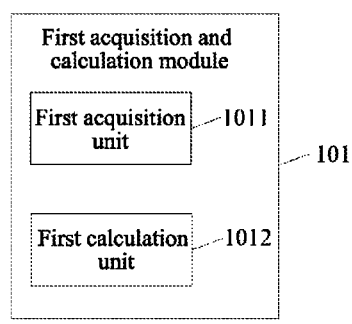
FIG. 8 is a structural diagram of a first acquisition and calculation module in the service server of the present document.

Referring to FIG. 8, FIG. 8 is a structural diagram of a first acquisition and calculation module in the service server according to the present document.

Based on one embodiment of the service server according to the present document, the first acquisition and calculation module 101 comprises:

a first acquisition unit 1011, used to acquire the first surveillance image captured by the camera at the preset first moment when the pan-tilt moves to the first moving angle; and a first calculation unit 1012, used to calculate the angle value of the first moving angle according to the current moving speed.

In the present embodiment, it is required to extend the surveillance scope of the camera by the movement of the pan-tilt, and set several pigment analysis ratio in advance before capturing the surveillance image by the camera. For instance, it is to set the pigment value range of dark image where the lighting equipment needs to be opened, i.e. the percentages of the bright pigments, the normal pigments and the dark pigments; set the pigment value range of bright light rays where the shading equipment needs to be opened, i.e. the percentages of the bright pigments, the normal pigments and the dark pigments.

When starting to capture an image, it is required to preset a first moment, which is indicated by t in the present embodiment, that is, the camera captures an image of the current surveillance environment at this moment when the pan-tilt moves to the first moving angle, and the service server acquires, through the first acquisition unit 1011, the first surveillance image captured by the camera through communication and connection with the camera. After acquiring the first surveillance image, the first calculation unit 1012 calculates the angle value of the first moving angle when the pan-tilt moves to the first moving angle according to the first moment t and the current moving speed of the pan-tilt recorded by the service server.

Figure 9:
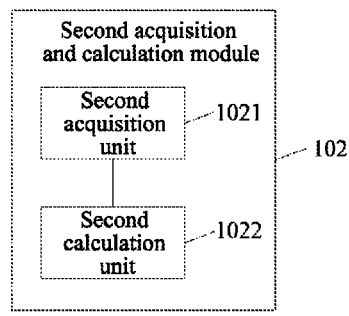
FIG. 9 is a structural diagram of a second acquisition and calculation module in the service server of the present document.

Referring to FIG. 9, FIG. 9 is a structural diagram of a second acquisition and calculation module in the service server according to the present document.

Based on one embodiment of the service server according to the present document, the second acquisition and calculation module 102 comprises:

a second acquisition unit 1021, used to acquire the second surveillance image captured by the camera at the preset second moment when the pan-tilt moves to the second moving angle; and a second calculation unit 1022, used to calculate the angle value of the second moving angle according to the current moving speed.

In the present embodiment, the preset second moment can be indicated by t', as the time interval between the second moment t' and the first moment t is required to meet a certain relationship, that is, it needs to be determined according to the viewing angle of the camera and the moving speed of the pan-tilt, this time interval can be indicated by t". In the present embodiment, the time interval t" for acquiring the surveillance image must be less than (the viewing angle of the camera)/(the moving speed of the pan-tilt*2), therefore, the second moment t' can be preset according to the time interval t" and the first moment t.

After the second moment t' is set, when the pan-tilt continues to move from the first moving angle to the second moving angle, the camera captures an image of the current surveillance environment, and the service server acquires, through the second acquisition unit 1021, the second surveillance image captured by the camera currently through the connection and communication with the camera. After the second surveillance image is acquired, similarly, the angle value of the second moving angle can be calculated by the second calculation unit 1022 when the pan-tilt moves to the second moving angle according to the second moment t' and the current moving speed of the pan-tilt recorded by the service server.

The first surveillance image is captured by the camera at the preset first moment when the pan-tilt moves to the first moving angle, and the angle value of the first moving angle is calculated according to the current moving speed of the pan-tilt; and the second surveillance image is captured by the camera at the preset second moment when the pan-tilt moves to the second moving angle; and the angle value of the second moving angle is calculated according to the current moving speed of the pan-tilt. The obtained angle value of the first moving angle and the angle value of the second moving angle can be used to determine the angle range of the common image of the first surveillance image and the second surveillance image. Therefore, it further ensures to improve the convenience and accuracy of moving detection.

Figure 10:
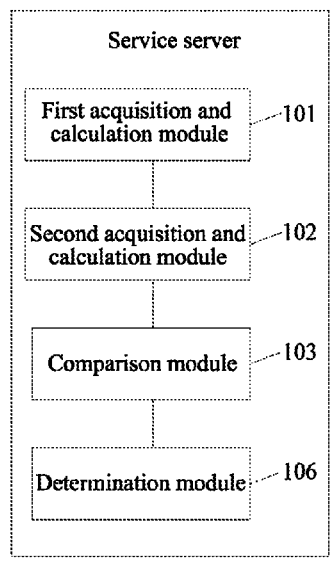
FIG. 10 is a structural diagram of a further embodiment of the service server of the present document.

Referring to FIG. 10, FIG. 10 is a structural diagram of a further embodiment of the service server according to the present document.

Based on one embodiment of the present document, a further embodiment of the service server of the present document is put forward. In the present embodiment, the service server further comprises:

a determination module 106, used to determine the viewing angle range of the common image of the first surveillance image and the second surveillance image according to the viewing angle of the camera and the current moving speed.

In the present embodiment, after the captured first surveillance image and the second surveillance image are acquired during the process that the pan-tilt moves, and the angle value of the first moving angle and the angle value of the second moving angle are calculated, according to the angle value of the first moving angle and the angle value of the second moving angle as well as the viewing angle of the camera and the current moving speed of the pan-tilt, the determination module 106 determines the angle range of the common image part of the first surveillance image captured when the pan-tilt moves for the first moving angle and the second surveillance image captured when the pan-tilt moves for the second moving angle, thereby whether moving detection occurs is judged according to the determined common image.

After the captured first surveillance image and the second surveillance image are acquired, and the angle value of the first moving angle and the angle value of the second moving angle are calculated, according to the viewing angle of the camera and the current moving speed of the pan-tilt, the viewing angle range of the common image of the first surveillance image and the second surveillance image is determined, so as to judge whether moving detection occurs, which further ensures the accuracy of moving detection alarm in a great extent.

The present document also provides a system for moving detection.

Figure 11:
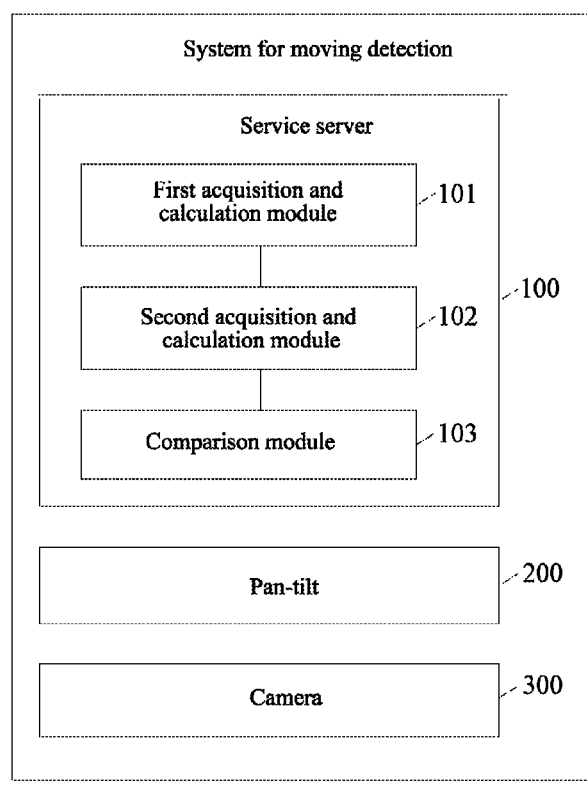
FIG. 11 is a structural diagram of one embodiment of the system for moving detection of the present document.

FIG. 11 is a structural diagram of one embodiment of the system for moving detection according to the present document.

The system for moving detection provided by the present embodiment comprises a service server 100, a pan-tilt 200, and a camera 300, wherein:

the service server 100 is used to:

acquire a first surveillance image captured by the camera at a preset first moment, and calculate a first moving angle of the pan-tilt;

acquire a second surveillance image captured by the camera at a preset first moment, and calculate a second moving angle of the pan-tilt;

determine by comparison whether common images in the first surveillance image and the second surveillance image are consistent according to the first moving angle and the second moving angle, if inconsistent, trigger a moving detection alarm;

the pan-tilt 200 is used to extend a surveillance scope by rotation of the pan-tilt;

the camera 300 is used to capture a surveillance image.

As the viewing angle of the camera 300 is usually limited, when the scope of the region requiring surveillance in the current surveillance environment is rather large, it is required to control the movement of the pan-tilt 200 in a certain direction to achieve the purpose of extending the surveillance scope. In the present embodiment, the service server 100 controls the pan-tilt 200 to move in a certain speed, and the camera captures the first surveillance image at the preset first moment when the pan-tilt 200 moves to the first moving angle and the first acquisition and calculation module 101 of the service server 100 acquires the first surveillance image. Since the viewing angle of the camera 300 is known, and the moving speed of the pan-tilt 200 is also known, the first acquisition and calculation module 101 can calculate the first moving angle of the pan-tilt 200 at present according to the first moment and the moving speed of the pan-tilt 200.

During the process that the pan-tilt 200 continues to move, the camera 300 captures the second surveillance image at the preset second moment when the pan-tilt 200 moves to the second moving angle, and then the first acquisition and calculation module 102 of the service server 100 acquires the first surveillance image. In addition, the first acquisition and calculation module 102 calculates the second moving angle of the pan-tilt 200 at present according to the second moment and the moving speed of the pan-tilt 200. In the present embodiment, the time interval between the second moment and the first moment is usually required to meet a certain relationship, that is, it is required to be determined according to the viewing angle of the camera 300 and the moving speed of the pan-tilt 200.

After the first surveillance image and the second surveillance image captured by the camera are acquired, and the corresponding first moving angle and second moving angle are calculated, the viewing angle scope of the common image of the first surveillance image and the second surveillance image can be determined according to the first moving angle and the second moving angle as well as the viewing angle of the camera. Afterwards, the comparison module 103 compares the common images in the first surveillance image and the second surveillance image to determine whether they are consistent, if inconsistent, it indicates the current surveillance environment changes, and the moving surveillance occurs, and then the moving detection alarm is triggered.

The embodiment of the system for moving detection comprises the technical solutions of all of the embodiments of the above service server, and the achieved technical effects are completely same, so they are not repeated here.

The above description is merely for the preferred embodiments of the present document, while the patent protection scope of the present document is not confined by this. All the equivalent structures or equivalent flowchart transformations made based on the specification and accompany content of the present document, or direct or indirect applications to other related technical fields should all fall into the patent protection scope of the present document in the same way.

INDUSTRIAL APPLICABILITY

According to the embodiments of the present document, the service server acquires the first surveillance image captured by the camera at the preset first moment, and calculates the first moving angle of the pan-tilt; and acquires the second surveillance image captured by the camera at the preset second moment, and calculates the second moving angle of the pan-tilt; determines by comparison whether the common images in the first surveillance image and the second surveillance image are consistent, if inconsistent, triggers the moving detection alarm. This method is applied to implement the moving detection when the camera is in moving state, and ensures the accuracy of moving detection alarm in a great extent.

What we claim is:

1. A method for moving detection, comprising:
    a service server acquiring a first surveillance image captured by a camera at a preset first moment, and calculating a first moving angle of a pan-tilt;
    acquiring a second surveillance image captured by the camera at a preset second moment, and calculating a second moving angle of the pan-tilt; and
    determining by comparison whether common images in the first surveillance image and the second surveillance image are consistent according to the first moving angle and the second moving angle; if inconsistent, triggering a moving detection alarm;
    wherein a time interval between the preset second moment and the preset first moment is less than (a viewing angle of the camera)/(a moving speed of the pan-tilt*2).

2. The method according to claim 1, before executing the step of acquiring a first surveillance image captured by a camera at a preset first moment, further comprising:
    sending a control request to the pan-tilt to control movement of the pan-tilt;
    receiving a control response message returned by the pan-tilt, and recording a current moving speed reported by the pan-tilt.

3. The method according to claim 2, wherein, the step of acquiring a first surveillance image captured by a camera at a preset first moment, and calculating a first moving angle of a pan-tilt comprises:
    acquiring the first surveillance image captured by the camera at the preset first moment when the pan-tilt moves to the first moving angle;
    calculating an angle value of the first moving angle according to the current moving speed.

4. The method according to claim 3, wherein, the step of acquiring a second surveillance image captured by the camera at a preset second moment, and calculating a second moving angle of the pan-tilt comprises:
    acquiring the second surveillance image captured by the camera at the preset second moment when the pan-tilt moves to the second moving angle;
    calculating an angle value of the second moving angle according to the current moving speed.

5. The method according to claim 2, before executing the step of determining by comparison whether common images in the first surveillance image and the second surveillance image are consistent according to the first moving angle and the second moving angle, further comprising:
    determining a viewing angle range of the common image of the first surveillance image and the second surveillance image according to the viewing angle of the camera and the current moving speed.

6. The method according to claim 3, before executing the step of determining by comparison whether common images in the first surveillance image and the second surveillance image are consistent according to the first moving angle and the second moving angle, further comprising:
    determining a viewing angle range of the common image of the first surveillance image and the second surveillance image according to the viewing angle of the camera and the current moving speed.

7. The method according to claim 4, before executing the step of determining by comparison whether common images in the first surveillance image and the second surveillance image are consistent according to the first moving angle and the second moving angle, further comprising:
    determining a viewing angle range of the common image of the first surveillance image and the second surveillance image according to the viewing angle of the camera and the current moving speed.

8. The method according to claim 1, before executing the step of determining by comparison whether common images in the first surveillance image and the second surveillance image are consistent according to the first moving angle and the second moving angle, further comprising:
    determining a viewing angle range of the common image of the first surveillance image and the second surveillance image according to the viewing angle of the camera and the current moving speed.

9. A service server, comprising:
    a first acquisition and calculation module, configured to acquire a first surveillance image captured by a camera at a preset first moment, and calculate a first moving angle of a pan-tilt;
    a second acquisition and calculation module, configured to acquire a second surveillance image captured by a camera at a preset second moment, and calculate a second moving angle of a pan-tilt;
    a comparison module, configured to determine by comparison whether common images in the first surveillance image and the second surveillance image are consistent according to the first moving angle and the second moving angle, if inconsistent, trigger a moving detection alarm;
    wherein a time interval between the preset second moment and the preset first moment is less than (a viewing angle of the camera)/(a moving speed of the pan-tilt*2).

10. The service server according to claim 9, further comprises:
    a determination module, configured to determine a viewing angle range of the common image of the first surveillance image and the second surveillance image according to a viewing angle of the camera and the current moving speed.

11. The service server according to claim 9, further comprising:
    a request sending module, configured to send a control request to the pan-tilt to control movement of the pan-tilt; and
    a recording module, configured to receive a control response message returned by the pan-tilt, and record a current moving speed reported by the pan-tilt.

12. The service server according to claim 11, wherein, the first acquisition and calculation module comprises:
    a first acquisition unit, configured to acquire the first surveillance image captured by the camera at the preset first moment when the pan-tilt moves to the first moving angle; and
    a first calculation unit, configured to calculate an angle value of the first moving angle according to the current moving speed.

13. The service server according to claim 12, wherein, the second acquisition and calculation module comprises:
    a second acquisition unit, configured to acquire the second surveillance image captured by the camera at the preset second moment when the pan-tilt moves to the second moving angle; and a second calculation unit, configured to calculate an angle value of the second moving angle according to the current moving speed.

14. The service server according to claim 11, further comprises:
a determination module, configured to determine a viewing angle range of the common image of the first surveillance image and the second surveillance image according to a viewing angle of the camera and the current moving speed.

15. The service server according to claim 12, further comprises:
a determination module, configured to determine a viewing angle range of the common image of the first surveillance image and the second surveillance image according to a viewing angle of the camera and the current moving speed.

16. The service server according to claim 13, further comprises:
a determination module, configured to determine a viewing angle range of the common image of the first surveillance image and the second surveillance image according to a viewing angle of the camera and the current moving speed.

17. A system for moving detection, comprising a pan-tilt extending a surveillance scope through a rotation of the pan-tilt, a camera capturing a surveillance image, and a service server, wherein, the service server is configured to:
acquire a first surveillance image captured by the camera at a preset first moment, and calculate a first moving angle of the pan-tilt;
acquire a second surveillance image captured by the camera at a preset second moment, and calculate a second moving angle of the pan-tilt;
determine by comparison whether common images in the first surveillance image and the second surveillance image are consistent according to the first moving angle and the second moving angle, if inconsistent, trigger a moving detection alarm;
wherein a time interval between the preset second moment and the preset first moment is less than (a viewing angle of the camera)/(a moving speed of the pan-tilt*2).

* * * * *